(12) United States Patent
Elahie

(10) Patent No.: US 12,106,437 B1
(45) Date of Patent: Oct. 1, 2024

(54) SYSTEMS AND METHODS FOR GENERATING POINT CLOUDS WITH INFINITELY SCALABLE RESOLUTIONS FROM A THREE-DIMENSIONAL MESH MODEL

(71) Applicant: Illuscio, Inc., Culver City, CA (US)

(72) Inventor: Dwayne Elahie, Culver City, CA (US)

(*) Notice: Subject to any disclaimer, the term of this patent is extended or adjusted under 35 U.S.C. 154(b) by 0 days.

(21) Appl. No.: 18/409,475

(22) Filed: Jan. 10, 2024

(51) Int. Cl.
*G06T 17/20* (2006.01)

(52) U.S. Cl.
CPC ........ *G06T 17/205* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 2015/0187130 A1* | 7/2015 | Guskov | G06T 17/20 345/643 |
| 2023/0031750 A1* | 2/2023 | Li | G06T 17/20 |
| 2023/0050860 A1* | 2/2023 | Ilola | H04N 19/70 |
| 2023/0290063 A1* | 9/2023 | Mammou | G06T 17/205 |
| 2024/0062466 A1* | 2/2024 | Schur | G06T 17/20 |

* cited by examiner

*Primary Examiner* — James A Thompson
(74) *Attorney, Agent, or Firm* — Ansari Katiraei LLP; Arman Katiraei; Sadiq Ansari

(57) ABSTRACT

A modeling system converts polygons of a three-dimensional (3D) mesh model to points of a point cloud in an automated manner that increases the resolution and visual fidelity of the point cloud relative to the 3D mesh model. The system receives the polygons of the 3D mesh model, and generates points over the flat plane of each polygon according to a density and arrangement that increases the resolution of the points relative to the original polygon. The system receives an enhancement map with values for displacing the polygons of the 3D mesh model. The system displaces the generated points by mapping the values from positions in the enhancement map to corresponding positions of the generated points. The system generates the point cloud with the displaced points to provide improved visual quality and detail relative to the polygons of the 3D mesh model after enhancement with the enhancement map.

20 Claims, 7 Drawing Sheets

SYSTEMS AND METHODS FOR GENERATING POINT CLOUDS WITH INFINITELY SCALABLE RESOLUTIONS FROM A THREE-DIMENSIONAL MESH MODEL

BACKGROUND

A three-dimensional (3D) mesh model is a 3D representation of an object or scene that is formed by a connected set of polygons. The polygons form the 3D shape or structure of the object or scene, and may present the colors and other visual characteristics of the represented object or scene. Various techniques may be used to improve the visual quality of the 3D mesh model. For instance, texture mapping, displacement mapping, bump mapping, normal mapping, and/or other techniques may be used to add displacement across the otherwise flat planes of the polygons. Despite these techniques, the resolution of a 3D mesh model is fixed based on the number of polygons.

Existing techniques for converting the polygons into other 3D formats do nothing to improve the resolution of the represented object or scene. For instance, existing techniques create a point cloud representation of the object or scene by replacing the polygons with points defined at the polygon vertices. The resulting point cloud is sparse and contains less image data than the replaced polygons resulting in an even lower resolution representation of the object or scene than the original 3D mesh model.

DETAILED DESCRIPTION OF PREFERRED EMBODIMENTS

Figure 1:
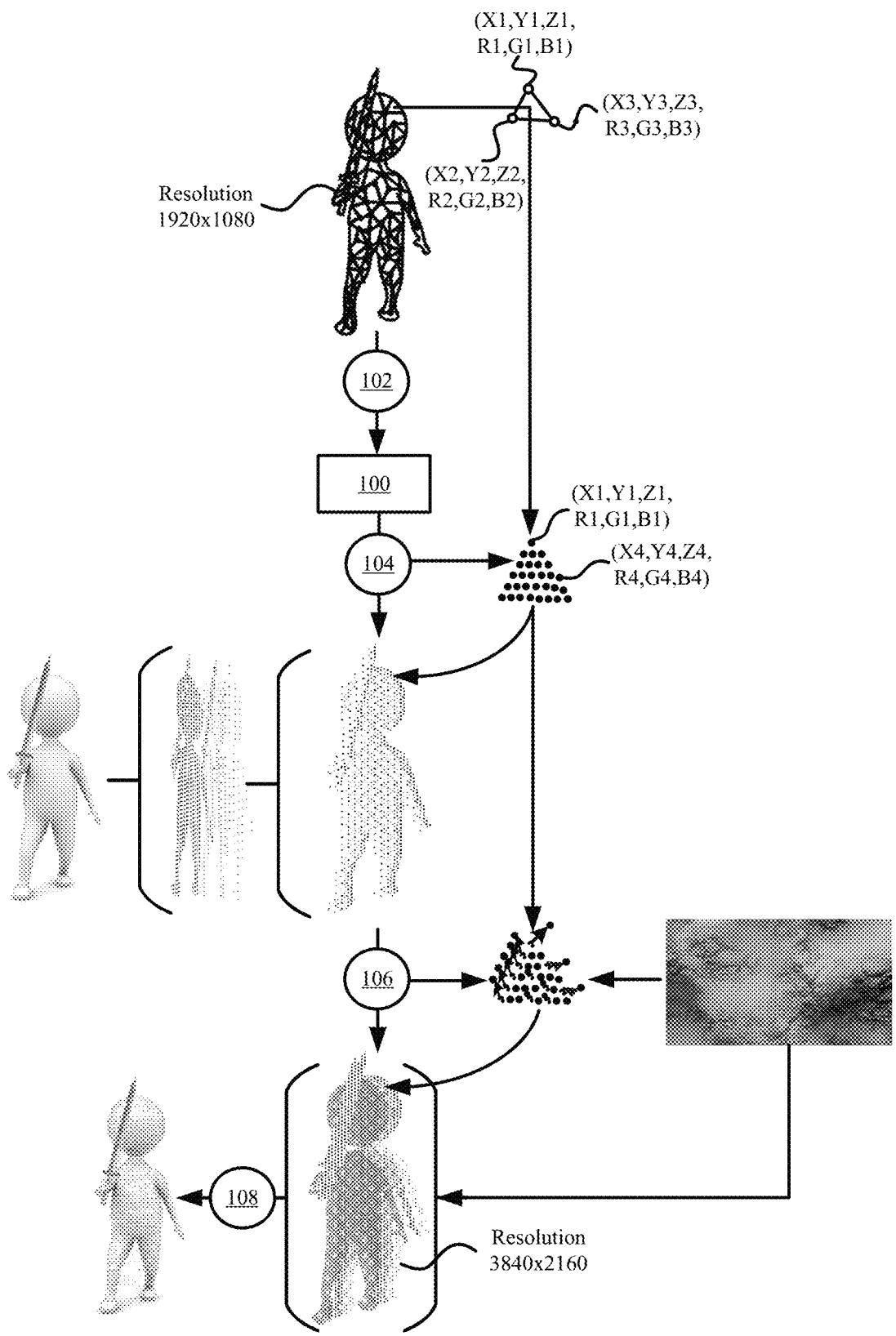
FIG. 1 illustrates an example of generating a point cloud with infinitely scalable resolution from a three-dimensional (3D) mesh model in accordance with some embodiments presented herein.

The following detailed description refers to the accompanying drawings. The same reference numbers in different drawings may identify the same or similar elements.

Provided are systems and associated methods for generating point clouds with infinitely scalable resolutions from a three-dimensional (3D) mesh model. The systems and associated methods convert the individual polygons of the 3D mesh model into any number of discrete points, and generate a point cloud representation for the object or scene of the 3D mesh model based on the generated points. The systems and associated methods adapt existing enhancement maps and mapping techniques (e.g., texture, displacement, bump, normal, and/or other maps and mapping techniques) of the 3D mesh model to apply to the generated points so that the same undulations or enhancements made to the flat planes of the polygons are transferred to the sets of points that represent each of those singular flat planes with numerous discrete primitives rather than one single polygon. Since the number of points generated for each polygon is infinitely scalable, the resulting point cloud may have a higher resolution than the original 3D mesh model, and may present the represented object or scene with more visual detail than the original 3D mesh model especially when the represented object or scene is presented or rendered from a closeup or zoomed in viewpoint.

A 3D modeling system generates the points that represent each polygon of the 3D mesh model mathematically or formulaically so that the form, plane, or structure of the polygon is preserved or even recreated at a higher resolution with the points. For instance, each polygon, regardless of the size at which it is rendered onscreen, is a representation of a flat plane. Displacement mapping may create an effect where positions over the flat plane are varied (e.g., raised or lowered). However, when zooming in to view the polygon at a closer distance, the warping and distortions of the single polygon create blurry or blocky visualizations as the pixels produced for the rendering of the single polygon outnumber the undulations or displacements specified in the displacement map and/or because the pixels do not represent discrete primitives that are separately rendered but rather the single polygon with the applied warping or distortion. However, by converting the single polygon to any number of points and individually displacing each generated point with the displacement map, the 3D modeling system increases the resolution of the surface represented by the polygon and eliminates the blurry or blocky visualizations of a warped or distorted polygon. Specifically, the 3D modeling system may define more points than the number of undulations or displacements specified in the displacement map for a single polygon, and may interpolate the displacement of the points that do not directly align with an undulation or displacement specified in the displacement map. Consequently, the resulting set of disconnected and individually displaced points may be defined at infinite positions across the plane of the polygon such that there is no distortion or warping when rendering the represented surface regardless of the level of zoom as each pixel of the rendered visualization may be generated from a discretely defined point rather than distortions applied over the plane of a single polygon.

FIG. 1 illustrates an example of generating a point cloud with infinitely scalable resolution from a 3D mesh model in accordance with some embodiments presented herein. 3D modeling system 100 receives (at 102) the 3D mesh model for conversion to a point cloud. The 3D mesh model may be stored as a file, and may be defined with a connected set of polygons that collectively generate the 3D form of one or more represented objects and/or scenes. Each polygon is a planar multi-sided primitive that is defined with coordinates for each vertex of the multi-sided primitive. Each vertex may also be defined with color values (e.g., red, green, blue, and/or other color values). The polygons may include triangles, quadrilaterals, pentagons, hexagons, and/or other flat planes with three or more sides and/or vertices. The 3D mesh model may also be defined with one or more texture maps, displacement maps, bump maps, normal maps, and/or other enhancement maps that enhance or modify the visual properties of the polygons.

3D modeling system 100 converts (at 104) each polygon into a set of points that are defined along the flat plane of the converted polygon. 3D modeling system 100 may generate each point of the set of points based on a Barycentric interpolation or other technique that determines different positions about the flat plane spanned by a converted polygon. For instance, 3D modeling system 100 may obtain the vertices for a polygon and a desired distribution for a set of points to generate for that polygon. 3D modeling system 100 defines each point of the set of points with Barycentric coordinates that are determined from the coordinates of the polygon vertices with the Barycentric coordinates specifying a position on the flat plane of the polygon. The desired distribution specifies the number of points to represent the flat plane and the relative positioning for the points. Accordingly, each point is defined with coordinates that specify a position in 3D space that is between the coordinates of the polygon vertices and along the flat plane that connects the vertices. The desired distribution is configurable such that the number of generated points for representing the polygon may range from three points to millions of points (or an unlimited number of points). The desired distribution may specify a static conversion of each polygon to N number of points, or may specify a variable conversion that specifies generating points with a specific density over the space spanned by the polygon. For instance, the variable conversion may specify generating a point at every third x-coordinate value and every second y-coordinate value between the vertices of a polygon with a constant z-coordinate value. Alternatively, the variable conversion may specify generating points that are specific distance apart from one another and that remain within the plane of the polygon.

3D modeling system 100 displaces (at 106) the generated points based on a displacement map that was applied to the polygons of the 3D mesh model. The displacement map be defined as a set of values with each value specifying an amount by which to displace a different position along a polygon or a different coordinate in 3D space. For instance, the displacement map may include values between 0 and 1. A value of 0 corresponds to a maximum inward or negative displacement of a particular position along a polygon, and a value of 1 corresponds to a maximum outward or positive displacement of the particular position along the polygon. The displacement map value may specify 3D displacement. In other words, one or more values may be specified for each position along a polygon with each value specifying a positive or negative displacement about one of the x, y, and z coordinates or planes.

3D modeling system 100 adapts the displacement map so that the displacement values from different positions in the displacement map map to the coordinates of the generated points and are used to displace the corresponding points. In some embodiments, 3D modeling system 100 performs a triplanar projection of the displacement map onto the generated points. For points that do not map to or align with a specific value in the displacement map due to a greater number of points being generated than values in the displacement map, 3D modeling system 100 may interpolate the displacement of those points based on displacement map values mapping to immediately neighboring positions or points.

3D modeling system 100 generating (at 108) a visualization from rendering the generated points of the point cloud. The visualization has a different resolution than a visualization generated from rendering the polygons of the original 3D mesh model because of the conversion (at 104) of the polygons to points and the displacement (at 106) of the points. For instance, when the number of generated points exceeds the number of defined values in the displacement map, the point cloud may be rendered at a higher resolution and with improved visual quality over the original 3D mesh model. Specifically, details with the represented object or scene may be rendered at a closer distance without becoming blurring or blocky in the point cloud than in the 3D mesh model and/or the same details may be presented with greater clarity and visual fidelity due to the details being rendered from numerous discrete points in the point cloud rather than single polygons in the 3D mesh model.

To simplify the conversion of polygons to points, 3D modeling system 100 may deconstruct or decompose the polygons of the 3D mesh model into triangles. For instance, 3D modeling system 100 may perform fan triangulation to break a four or more sided polygon into multiple triangles, and may perform a uniform conversion of triangles into points rather than perform different conversions of triangles, quadrilaterals, pentagons, and/or other multi-sided polygons to points.

Figure 2:
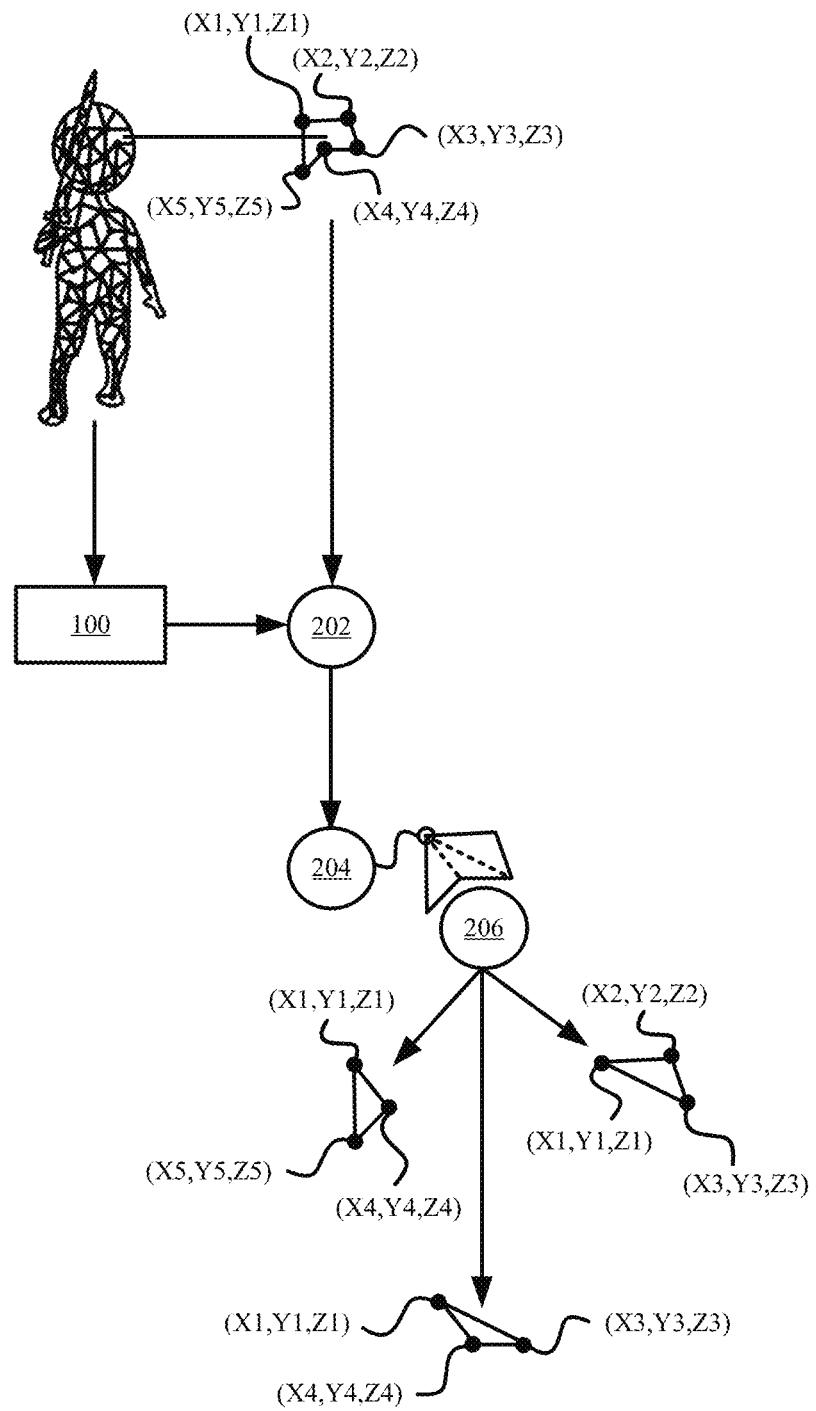
FIG. 2 illustrates an example of deconstructing polygons of a 3D mesh model into triangles for point conversion in accordance with some embodiments presented herein.

FIG. 2 illustrates an example of deconstructing polygons of a 3D mesh model into triangles for point conversion in accordance with some embodiments presented herein. 3D modeling system 100 receives the 3D mesh model and selects (at 202) a polygon that is defined with four or more vertices. The four or more vertices identify that the polygon is not a triangle, and is therefore one that is selected (at 202) for deconstruction.

3D modeling system 100 deconstructs (at 204) the polygon by a selecting one vertex and drawing or defining edges from the selected vertex to all other vertices of the selected (at 202) polygon. 3D modeling system 100 defines (at 206) the two or more triangles that recreate the deconstructed (at 204) polygon. Specifically, each triangle is defined with a set of three unique vertices of the deconstructed (at 204) polygon.

Other deconstruction techniques may be used to define all polygons of the 3D mesh model as triangles. In any case, 3D modeling system 100 converts the deconstructed triangles or the original polygon to different sets of points according to a desired distribution of points for the converted polygons.

Figure 3:
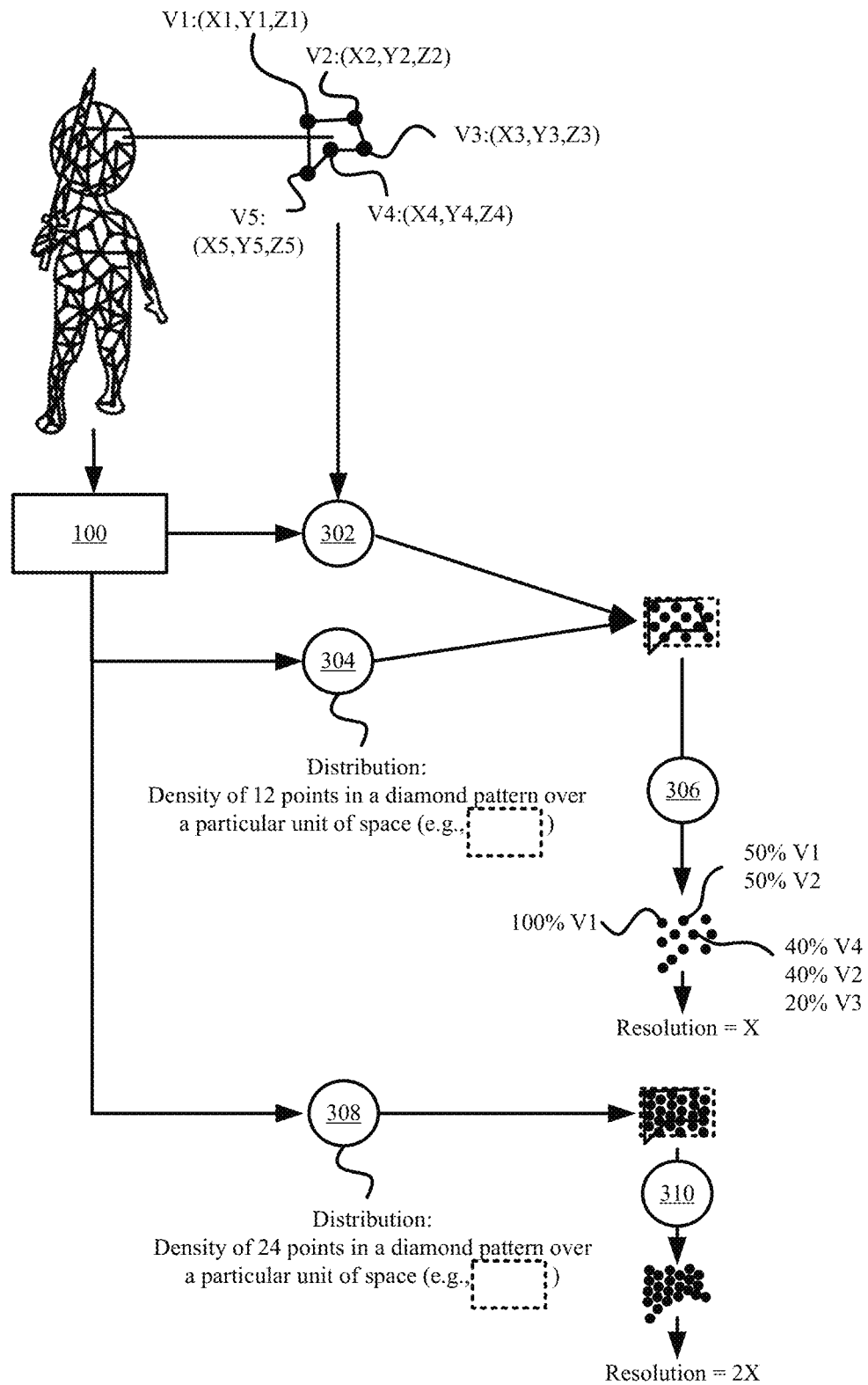
FIG. 3 illustrates an example of converting a polygon to a set of points that satisfy a specified distribution and/or that increase the resolution of the polygon during conversion in accordance with some embodiments presented herein.

FIG. 3 illustrates an example of converting a polygon to a set of points that satisfy a specified distribution and/or that increase the resolution of the polygon during conversion in accordance with some embodiments presented herein. 3D modeling system 100 obtains (at 302) the coordinates for each vertex of the polygon.

3D modeling system 100 determines (at 304) a configured distribution for converting the polygon to points. The configured distribution may be defined with a number of points to generate for a polygon or for a region of space spanned by the polygon, the manner with which the generated points are positioned to represent the polygon, and/or other variable that alter the conversion of polygons to points. The number of points to generate may be defined as a fixed value or as criteria for determining the number of points based on the space or region spanned by the polygon, a desired density of points for that space or region, and/or units by which the coordinates or space of the point cloud are measured. The space or region spanned by the polygon may be computed based on the vertex coordinates and/or the surface area of the polygon. For instance, the configured distribution may specify generated points with a specific density in a particular area or region of space with a specific distance or spatial separation between them or for generating points at a particular unit of distance in the 3D coordinate system of the point cloud. The manner with which the points are generated may include defining positional offsets between the generated points so that the points are in aligned about a common axis (e.g., have a constant x and z coordinate value but differing y coordinate values) or are aligned to represent the plane of the replaced polygon with a particular structure or pattern of points (e.g., a diamond distribution of points, a triangular distribution, a circular distribution, etc.). In any case, the configured distribution may define a conversion that changes the resolution of the surface or region of space spanned by the polygon.

3D modeling system 100 generates (at 306) points for the point cloud representation of the polygon based on the polygon vertex coordinates and the configured distribution. 3D modeling system 100 generates a coordinate system from the polygon vertex coordinates according to a Barycentric or other technique. The coordinate system contains coordinates for discrete positions along the flat plane of the polygon. The discrete positions and the corresponding coordinates are derived from attributing different weights to the polygon vertices. For instance, a first point may be defined at a coordinate in the 3D space by attributing a 50% weight to the coordinates of the first polygon vertex, a 30% weight to the coordinates of the second polygon vertex, and a 20% weight to the coordinates of the third polygon vertex, and a second point may be defined at a coordinate in the 3D space by attributing a 20% weight to the coordinates of the first polygon vertex, a 30% weight to the coordinates of the second polygon vertex, and a 50% weight to the coordinates of the third polygon vertex. The different weights that are attributed to each polygon vertex and that are used to define each point are calculated to produce the configured distribution of points for the plane spanned by the polygon.

As shown in FIG. 3, the configured distribution specifies generating 12 points in a diamond pattern for each square-shaped unit of space spanned by the polygon. Accordingly, if the polygon was a square with a surface area equal to the surface area of the square-shaped unit of space, 3D modeling system 100 may generate 12 points in the diamond pattern to represent that polygon. However, if the polygon was a triangle with a surface area that is one half the surface area of the square-shaped unit of space, then 3D modeling system 100 may generate 5 points that are distributed according to the diamond pattern over the surface area of the triangle. The positions or coordinates for each generated point are derived by assigning different weights to the polygon vertex coordinates in order to generate the points according to the configured distribution.

By applying an infinite number of weights to the polygon vertices and the infinite number of weights mapping to infinite positions in the generated coordinate system representing the flat plane spanning between the polygon vertices, 3D modeling system 100 is able to convert the polygon into an infinite number of points with each point having a discrete position within the infinitely scalable coordinate system. Accordingly, to increase the resolution of the point cloud, 3D modeling system 100 generates more points at new positions defined by additional unique vertex weight combinations that satisfy the pattern or structure specified for the arrangement of points in the configured distribution. In other words, the density or number of points specified in the configured distribution may be increased so that additional points are generated along the same plane of the polygon in the same pattern or structure so that the resolution of that plane now represented with points is increased.

For instance, FIG. 3 illustrates configuring (at 308) 3D modeling system 100 for a denser and higher resolution conversion of the polygon to points, and 3D modeling system 100 converting (at 310) the polygon according to the denser and higher resolution distribution. Specifically, 3D modeling system 100 defines a greater number of points in the same diamond pattern at positions determined from additional weight combinations being applied to the vertex coordinates of the polygon.

3D modeling system 100 may further define each generated point with a set of color values or other visual characteristics. In some embodiments, 3D modeling system 100 defines the color values for a point created at a particular position about the plane of a converted polygon based on the color values that are defined at that particular position about the plane of the converted polygon. In some such embodiments, the color values may be defined by applying the same weighting that was applied to the coordinates of each polygon vertex to the color values defined at each polygon vertex. In other words, 3D modeling system 100 may define the color values for a generated point by interpolating the color values that are defined at each vertex of the converted polygon based on the distance of the generated point from polygon vertex.

Figure 4:
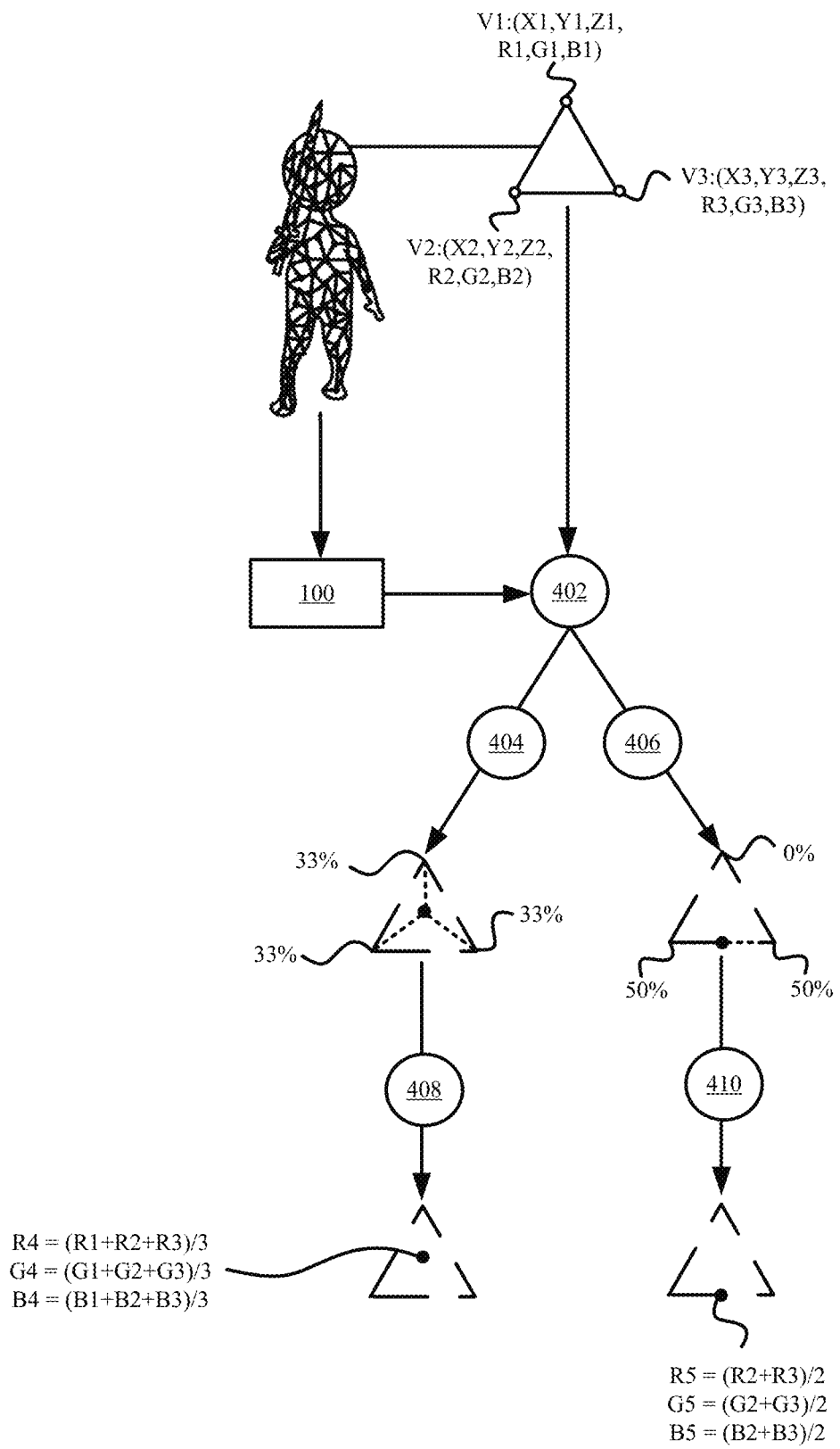
FIG. 4 illustrates an example of defining visual characteristics of a point generated from a converted polygon in accordance with some embodiments presented herein.

FIG. 4 illustrates an example of defining visual characteristics of a point generated from a converted polygon in accordance with some embodiments presented herein. 3D modeling system 100 determines (at 402) the coordinates for each vertex of the converted polygon and the color values defined for each vertex. For instance, each vertex may be defined with x, y, and z coordinate values and red, green, and blue color values.

3D modeling system 100 generates (at 404) a first point at a first position in a coordinate system of the converted polygon (e.g., a Barycentric coordinate system). The first position of the first point may be derived from an equal weighting of each vertex coordinates (e.g., a 33.3% weighting of the first vertex position, a 33.3% weighting of the second vertex position, and a 33.3% weighting of the third vertex position).

3D modeling system 100 generates (at 406) a second point at a second position in the same coordinate system of the converted polygon. The second position of the second point is derived based on a 0% weighting of the first vertex position or coordinates, a 50% weighting of the second vertex position or coordinates, and 50% weighting of the third vertex position or coordinates.

In this example, the polygon is an equilateral triangle such that an equal weighting of the vertex coordinates creates a point at the center of the triangle. The combination of weights assigned to each vertex for the generation of the first, second, and other points may be determined based on a distribution that is specified for the conversion of the polygon into points.

3D modeling system 100 defines (at 408) the color values of the first point by applying the same weights that were used to derive the positional coordinates of the first point to the color values of each vertex. For instance, 3D modeling system 100 defines (at 408) the color values of the first point based on an equal contribution of the color values defined for the first vertex, the second vertex, and the third vertex.

Similarly, 3D modeling system 100 defines (at 410) the color values of the second point by applying the same weights that were used to derive the positional coordinates of the second point to the color values of each vertex. The color values of the second point are therefore derived based on a 0% contribution of the color values defined for the first vertex, a 50% contribution of the color values defined for the second vertex, and a 50% contribution of the color values defined for the third vertex.

In some embodiments, other interpolation techniques may be used to define the color values of a generated point. For instance, the color values of a generated points may be defined based on the distance of the generated point to each of the polygon vertices. Accordingly, if the distance of the second point to the first vertex is 2 times greater than the distance to the second and third vertices, then 3D modeling system 100 may define the color values of the second point based on 20% contribution of the color values defined for the first vertex, a 40% contribution of the color values defined for the second vertex, and a 40% contribution of the color values defined for the third vertex.

In some embodiments, the color values and/or visual characteristics of each generated point may be defined from sources other than the converted polygon vertices. For instance, the polygon vertices may not be defined with color values. A texture map or other map may be used to associate colors to the polygons. In some such embodiments, 3D modeling system 100 may map the colors from the texture map to the generated points. 3D modeling system 100 determines the position of a generated point about the plane of the converted polygon, determines the color values from the texture map that are applied to that position about the plane of the converted polygon, and defines the color values of the point based on those determined color values from the texture map.

Figure 5:
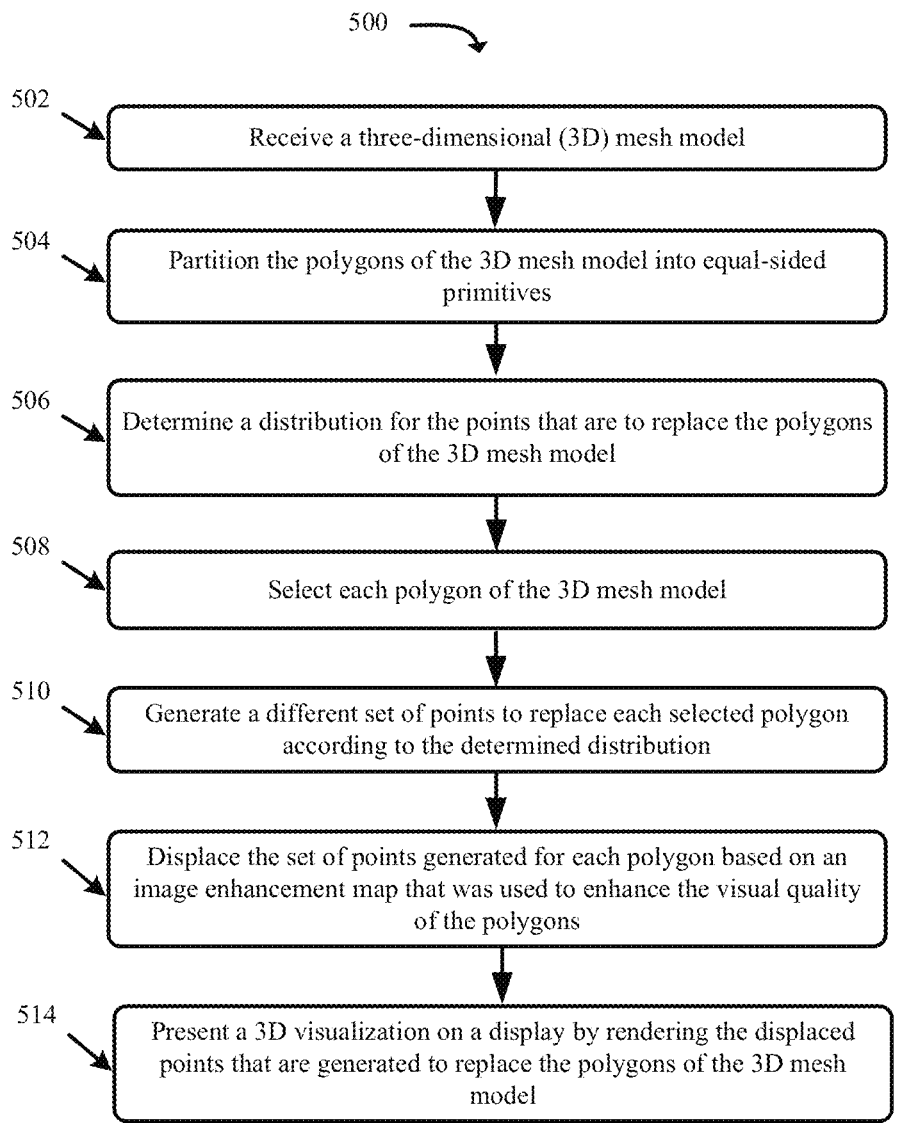
FIG. 5 presents a process 500 for converting polygons of a 3D mesh model to points of a point cloud that represent the same surfaces or features as the polygons with an increased resolution in accordance with some embodiments presented herein.

FIG. 5 presents a process 500 for converting polygons of a 3D mesh model to points of a point cloud that represent the same surfaces or features as the polygons with an increased resolution in accordance with some embodiments presented herein. Process 500 is implemented by 3D modeling system 100.

3D modeling system 100 may include one or more devices or machines with processors, memory, storage, network, and/or other hardware resources for the creation, interaction, viewing, editing, rendering, and/or other processing of 3D graphics. Process 500 may be implemented by specialized graphics hardware of 3D modeling system 100 including a graphics processing unit (GPU) and/or software applications that leverage the specialized graphics hardware to accelerate the processing of the 3D models and/or the generation of the point cloud from 3D mesh models.

Process 500 includes receiving (at 502) a 3D mesh model. Receiving (at 502) the 3D mesh model may include opening, loading, or accessing a file that is encoded with, stores, or otherwise contains the polygons that collectively form the shapes, structures, and/or forms of one or more 3D objects or 3D scenes represented by the 3D mesh model.

Each polygon of the 3D mesh model may be defined as a set of three or more vertices. Each vertex of the set of three or more vertices may be defined with coordinates for a position in a 3D space spanned by the 3D mesh model. Each vertex may also be defined with visual characteristics, such as red, green, and blue color values, that are interpolated with the visual characteristics of the other vertices for the same polygon to define colors across the flat plane spanning between the vertices.

The 3D mesh model or containing file may also be defined with one or more texture maps, displacement maps, bump maps, normal maps, and/or other enhancement maps that may be applied to the polygons in order to change the shapes and colors generated from rendering the polygons. For instance, the enhancement maps may be applied to the polygons to adjust the colors, lighting, or modify the flat surfaces or planes that are defined by the polygons. The enhancement maps, including a displacement map, may displace the surface vertices of a polygon along their surface normal in order to change the flat plane of the polygon to a complex shape.

Process 500 includes partitioning (at 504) the polygons of the 3D mesh model into equal-sided primitives. For instance, 3D modeling system 100 searches the 3D mesh model for polygons that are defined with four or more vertices, and deconstructs those polygons into two or more triangles that are each defined with three vertices. The partitioning (at 504) may involve performing a fan triangulation or other technique to define the triangles that collectively form a polygon with four or more vertices.

3D modeling system 100 may perform the partitioning (at 504) to create a uniform polygonal definition for the 3D mesh model for the purpose of accelerating the subsequent processing of the 3D mesh model and the conversion of the polygons to points. However, in some embodiments, the partitioning (at 504) may be optional, and 3D modeling system 100 may directly convert polygons with different numbers of vertices into a desired number of points.

Process 500 includes determining (at 506) a distribution for the points that are to replace the polygons of the 3D mesh model. The distribution may be defined as a specific resolution, a desired density of points in a particular region of 3D space, a number of points to be generated for each polygon or relative to an amount of space spanned by each polygon, and/or other criteria. The distribution may be defined by user input or may be a configurable setting of 3D modeling system 100.

Process 500 includes selecting (at 508) each polygon of the 3D mesh model. Selecting (at 508) a polygon includes retrieving the positional coordinates and/or visual characteristics that are defined for each vertex of the selected (at 508) polygon. For instance, 3D modeling system 100 obtains the x, y, and z coordinates for the position of each vertex, and the red color value, green color value, blue color value, and/or other visual characteristics defined for each vertex.

Process 500 includes generating (at 510) a different set of points to replace each selected (at 508) polygon according to the determined (at 506) distribution. Each of the set of points that is generated (at 510) for a particular polygon is defined with a position about the flat plane of the particular polygon. The position is derived from the vertex coordinates of the particular polygon. For instance, 3D modeling system 100 may associate different weights to the vertex coordinates of the particular polygon to generate (at 510) the set of points for the particular polygon according to the determined (at 506) distribution. Specifically, the distribution specifies the number of points that 3D modeling system 100 generates (at 510) to replace a single polygon and the distance or positions of the generated points relative to one another on the flat plane of the replaced polygon. In some embodiments, 3D modeling system 100 may plot the distribution over the flat plane of the particular polygon, determine a relative mapping for the point positions in the distribution on the flat plane, and determine the weightings to the vertex coordinates that correspond to the point positions and specify the coordinate values for the points. Determining the relative mapping may include determining a distance between each plotted point of the distribution to each vertex of the particular polygon, and computing the point coordinates based on weightings derived from the distances.

The distribution may specify any number of points or any resolution at which to convert the selected (at 508) polygon into points. For a high resolution, points may be generated at every definable coordinate along the plane of the selected (at 508) polygon. For an even higher resolution, the 3D space may be segmented into coordinates that span a smaller amount of the 3D space, and points may be defined at the segmented coordinates. In other words, the coordinate space of the 3D mesh model and/or point cloud may be scaled to achieve finer and finer resolutions, and the existing polygons may be converted into more and more points that are defined at closer and closer positions or coordinates. The size of the points may remain the same such that portions of the points may overlap despite the points being defined at discrete positions in the 3D space when the coordinate space is defined with closer and closer coordinates or coordinates that span smaller units of the 3D space.

Generating (at 510) the different set of points may also include defining color values and/or visual characteristics of each point based on the color values and/or visual characteristics of each vertex of the particular polygon. Similar to the derivation of the point coordinates, the point visual characteristics may be defined by weighting the visual characteristics of each vertex based on the distance or relative position of the point to each of the particular polygon's vertices.

Process 500 includes displacing (at 512) the set of points generated (at 510) for each polygon based on one or more of a displacement map, texture map, bump map, normal map, or other enhancement map that was used to enhance the visual quality of the polygons. The displacement (at 512) includes adjusting the positioning of the points to deviate from the flat plane of the replaced polygon based on values in the applied map that are defined for the positions of the displaced points in the applied map. For instance, a displacement map may include a grayscale image with values for each pixel that specify an amount of displacement for the position of the 3D model represented by that pixel or the position from the 3D space of the 3D mesh model or point cloud that maps to the pixel position. In some embodiments, 3D modeling system 100 applies the displacement map to the points based on a triplanar projection. The triplanar projection performs a 3D displacement of the points or a displacement that may modify the point position in any of the x, y, or z planes.

Accordingly, displacing (at 512) the set of points includes determining the coordinates of a newly generated point, mapping the coordinates to a value within the displacement map, and displacing the point by adjusting the coordinates according to a 3D projection of the value onto the point. In some embodiments, the displacement map includes values that are normalized or defined within a particular range to specify an amount to displace a point in one or more planes or axes.

Process 500 includes presenting (at 514) a 3D visualization on a display by rendering the displaced (at 512) points that are generated (at 510) to replace the polygons of the 3D mesh model. The resolution and visual quality of the visualization differs from the resolution and visual quality of the 3D mesh model. In some cases, the resolution and visual quality of the visualization generated from rendering the displaced points of the point cloud are greater than the resolution and visual quality of the 3D mesh model as more discrete points or primitives are used to represent the same surfaces in the point cloud than in the 3D mesh model. For instance, the displacement map may be defined at a resolution that is greater than the polygons of the 3D mesh model. The displacement map is used to subdivide the polygons into smaller polygons that are displaced according to the displacement map values or to warp or distort a surface vertices of a single polygon to introduce positional variation across that polygon. However, the resolution of the displacement map is fixed and can be exceeded by generating more points for a converted polygon than there are values defined in the displacement map for that polygon. Accordingly, when a user zooms into a visualization of a surface created by the polygons of the 3D mesh model until individual pixels of the visualization are defined by two or more polygon, the visualization becomes blurry or blocky. However, the number of points generated for a converted polygon may be scaled to exceed the values defined in the displacement map such that the individual pixels of the zoomed in visualization are rendered from discrete points of the generated point cloud and remain clear and sharp.

3D modeling system 100 may also store the generated points of the point cloud to a separate file. Specifically, the file stores the points that were generated from converting the polygons of the original 3D mesh model into a point cloud representation, and the resulting file may produce a visualization of the one or more objects or scenes represented by the original 3D mesh model at a higher resolution, with greater visual detail, and/or improved visual quality without a user having to redefine the polygons of the original 3D mesh model and/or without having to create higher resolution displacement maps to apply to the original 3D mesh model.

Figure 6:
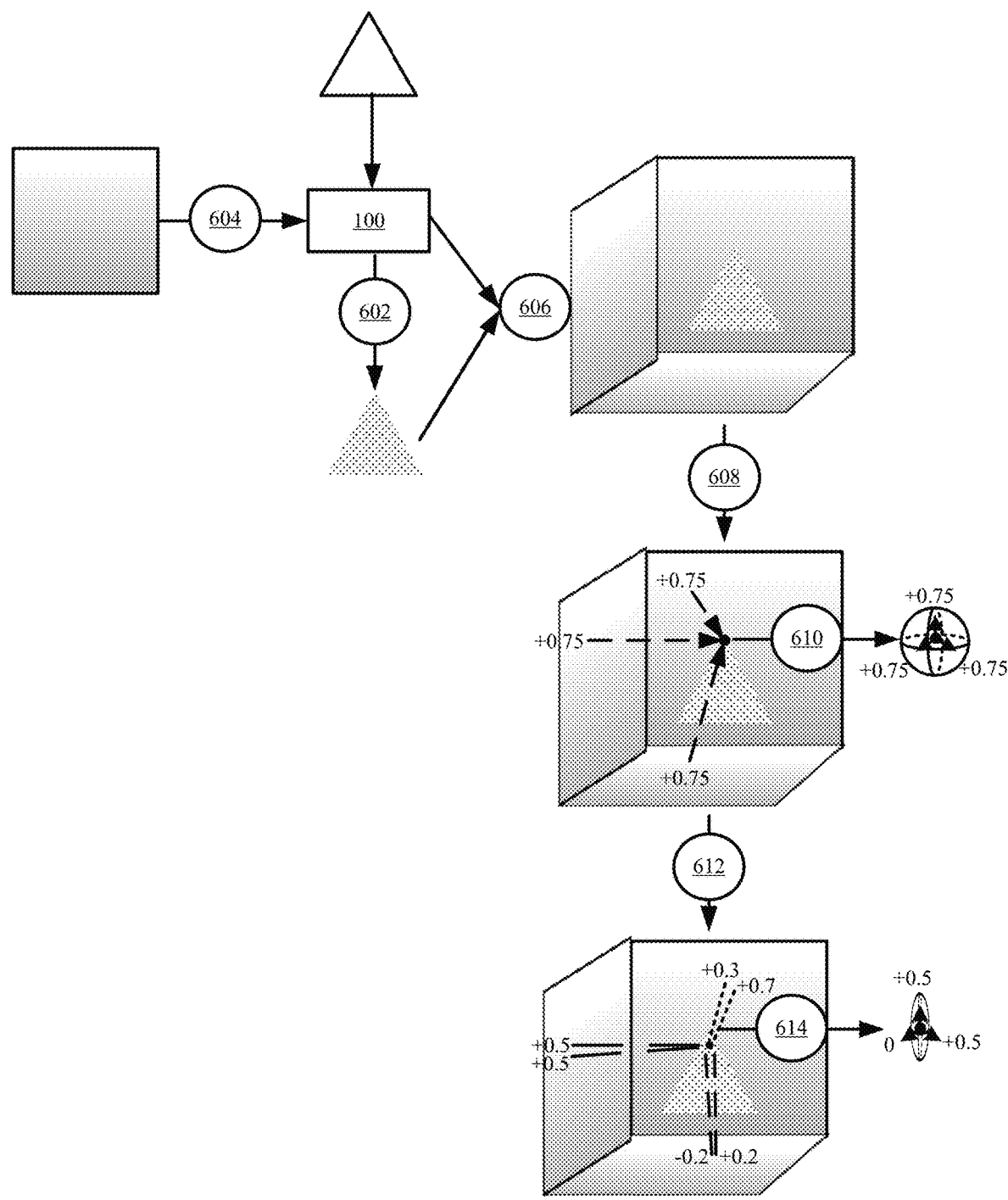
FIG. 6 illustrates an example of applying the displacement mapping to the set of points that are generated to replace a polygon in accordance with some embodiments presented herein.

FIG. 6 illustrates an example of applying the displacement mapping to the set of points that are generated to replace a polygon in accordance with some embodiments presented herein. 3D modeling system 100 converts (at 602) the polygon to the set of points according to a configured distribution.

3D modeling system 100 receives (at 604) a displacement map. The displacement map may be a grayscale image with values defined at different pixel positions that correspond to an amount of displacement to apply to a position in the 3D space of the point cloud mapping to the pixel position of the displacement map.

Applying the displacement map in a single dimension of the point cloud 3D space produces abnormal stretching and warping of the points and/or the surfaces represented by the points. Accordingly, 3D modeling system 100 projects (at 606) the displacement map from the three primary axes of the 3D space (e.g., a triplanar projection). Specifically, 3D modeling system 100 projects the displacement values from the displacement map onto the generated points from each of the three axes.

3D modeling system 100 displaces the points based on the displacement values that are projected onto those points from each of the three axes. In some embodiments, projecting the displacement values may include determining a mapping between the positions of the displacement values in the displacement map from each axis to a corresponding coordinate in the same axis of the 3D space in which the points are positioned.

As shown in FIG. 6, 3D modeling system 100 determines (at 608) that a first set of displacement values project onto or map to the position of a first point, and 3D modeling system 100 displaces (at 610) the first point in each of the three dimensions according to the displacement values projected onto the first point from each axis of the triplanar projection. Since the number of points or resolution of the point cloud may exceed the number of displacement values or resolution of the displacement map, 3D modeling system 100 may perform an interpolated displacement of points that are not directly aligned with and do not directly map to any displacement values in the displacement. For instance, 3D modeling system 100 determines (at 612) that the coordinates or position of a second point in the 3D space of the point cloud does not directly map to or align with any particular displacement values in the displacement map. Instead, the second point is positioned in between the projection of two distinct displacement values from the displacement map in each axis. Accordingly, 3D modeling system 100 interpolates the neighboring or closest displacement values from each axis, and displaces (at 614) the second point based on the interpolated displacement values. Interpolating the displacement values may include averaging or selecting the median displacement value from the neighboring or closest displacement values.

Figure 7:
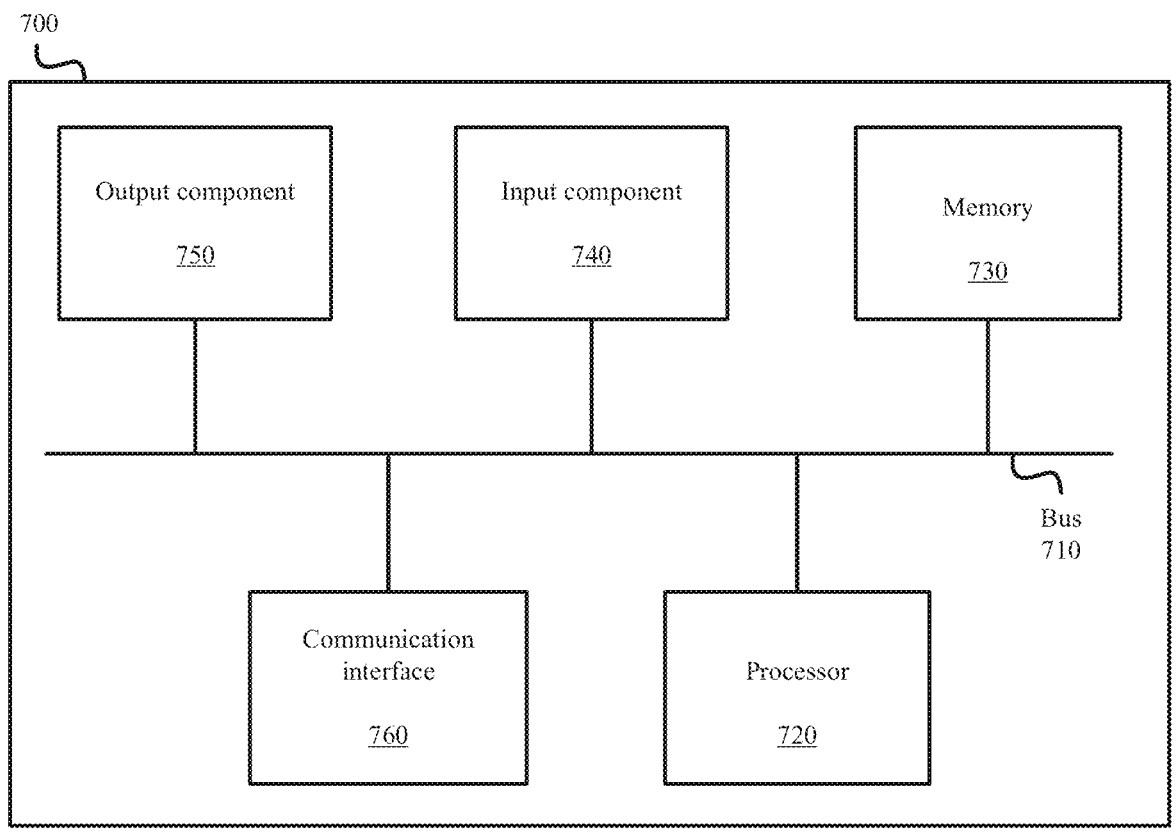
FIG. 7 illustrates example components of one or more devices, according to one or more embodiments described herein.

FIG. 7 is a diagram of example components of device 700. Device 700 may be used to implement one or more of the tools, devices, or systems described above (e.g., 3D modeling system 100). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a mesh model comprising a plurality of polygons that are defined in a three-dimensional (3D) space, that are connected to at least one other polygon, and that represent one or more objects or scenes at a first resolution, wherein each polygon of the plurality of polygons forms a flat plane between a plurality of vertices with each vertex of the plurality of vertices being shared with at least another polygon;
   replacing each polygon of the plurality of polygons with a different set of points positioned along the flat plane formed by that polygon according to a configured distribution, wherein the different set of points replacing each polygon are disconnected from one another and represent the one or more objects or scenes at a second resolution that is greater than the first resolution, and wherein each point of the different set of points replacing a particular polygon is defined with a different position along the flat plane formed by the particular polygon based on the plurality of vertices of the particular polygon and with visual characteristics that are derived from the plurality of vertices of the particular polygon;
   receiving an enhancement map comprising a plurality of values at different positions in the enhancement map for displacing the plurality of polygons;
   displacing the different set of points replacing each polygon of the plurality of polygons based on a mapping of the plurality of values from the different positions in the enhancement map to corresponding positions of the different set of points replacing each polygon, wherein said displacing comprises:
      determining a position of a particular point from the different set of points replacing the particular polygon that maps to the different position of a particular value from the plurality of values in the displacement map; and
      moving the particular point away from the flat plane of the particular polygon by an amount derived from the particular value in the displacement map; and
   generating a point cloud from the different set of points replacing each polygon and said displacing of the different set of points, wherein the point cloud does not include a polygon or mesh, and wherein the second resolution of the point cloud produces a visualization of the one or more objects or scenes with a visual quality that is greater than the first resolution of the mesh model enhanced with the enhancement map.

2. The method of claim 1, wherein replacing each polygon comprises:
   defining a first set of points at different positions along a first flat plane that connects to the plurality of vertices of a first polygon from the plurality of polygons with an arrangement and a density specified in the configured distribution; and
   defining a second set of points at different positions along a second flat plane that connects to the plurality of vertices of a second polygon from the plurality of polygons with the arrangement and the density specified in the configured distribution.

3. The method of claim 2, wherein defining the second set of points comprises:
   generating fewer points for the second set of points than the first set of points based on the second flat plane having a smaller surface area than the first flat plane.

4. The method of claim 2,
   wherein defining the first set of points comprises:
      defining the different positions for each point of the first set of points based on different weightings attributed to coordinates associated with each vertex of the plurality of vertices of the first polygon, wherein the different weightings result in the different positions along the first flat plane that spans between the plurality of vertices of the first polygon; and
   wherein defining the second set of points comprises:
      defining the different positions for each point of the second set of points based on different weightings attributed to coordinates associated with each vertex of the plurality of vertices of the second polygon.

5. The method of claim 2, wherein defining the first set of points comprises:
   determining a surface area of the first flat plane based on coordinates of the plurality of vertices of the first polygon;
   determining a particular number of points to generate as part of the first set of points based on the surface area and a density specified as part of the configured distribution; and
   generating the first set of points with the particular number of points that satisfies the density and with the different positions of the first set of points forming a pattern specified as part of the configured distribution.

6. The method of claim 1, wherein replacing each polygon comprises:
   selecting the particular polygon from the plurality of polygons;
   obtaining coordinates for each vertex of three or more vertices of the particular polygon; and
   generating a first set of points with coordinates derived from assigning different weights to the coordinates of each vertex of the three or more vertices of the particular polygon.

7. The method of claim 1, wherein replacing each polygon comprises:
   selecting the particular polygon from the plurality of polygons;
   determining a particular flat plane that spans between each vertex of three or more vertices of the particular polygon; and
   generating a first set of points along the particular flat plane with a density that increases a resolution of a surface represented by the particular polygon from the first resolution to the second resolution.

8. The method of claim 1, wherein replacing each polygon comprises:
   determining a number of vertices associated with each polygon of the plurality of polygons; and
   deconstructing a selected polygon with four or more vertices into two or more triangles that are each defined from a different set of three vertices from the four or more vertices of the selected polygon.

9. The method of claim 1, wherein displacing the different set of points comprises:
   producing a triplanar projection of the enhancement map onto the 3D space spanned by the different set of points for replacing each polygon; and
   adjusting a selected point across three axes based on a first value projected from the enhancement map onto the selected point from a first axis, a second value projected from the enhancement map onto the selected point from a second axis, and a third value projected from the enhancement map onto the selected point from a third axis.

10. The method of claim 1 further comprising:
    defining the configured distribution with a value indicating a number of points to generate over a given region of space and a pattern specifying a distribution for points generated over the given region of space.

11. The method of claim 1 further comprising:
    presenting the visualization of the one or more objects or scenes at the second resolution in response to rendering each point of the different set of points replacing each polygon at a position adjusted by said displacing.

12. The method of claim 1, wherein replacing each polygon comprises:
    determining coordinates for each vertex of a selected polygon of the plurality of polygons;
    defining a coordinate system based on the coordinates; and
    generating points with positions derived from references to the coordinate system.

13. A three-dimensional (3D) modeling system comprising:
    one or more hardware processors configured to:
      receive a mesh model comprising a plurality of polygons that are defined in a 3D space, that are connected to at least one other polygon, and that represent one or more objects or scenes at a first resolution, wherein each polygon of the plurality of polygons forms a flat plane between a plurality of vertices with each vertex of the plurality of vertices being shared with at least another polygon;
      replace each polygon of the plurality of polygons with a different set of points positioned along the flat plane formed by that polygon according to a configured distribution, wherein the different set of points replacing each polygon are disconnected from one another and represent the one or more objects or scenes at a second resolution that is greater than the first resolution, and wherein each point of the different set of points replacing a particular polygon is defined with a different position along the flat plane formed by the particular polygon based on the plurality of vertices of the particular polygon and with visual characteristics that are derived from the plurality of vertices of the particular polygon;
      receive an enhancement map comprising a plurality of values at different positions in the enhancement map for displacing the plurality of polygons;
      displace the different set of points replacing each polygon of the plurality of polygons based on a mapping of the plurality of values from the different positions in the enhancement map to corresponding positions of the different set of points replacing each polygon, wherein said displacing comprises:
        determining the different position of a particular point from the different set of points replacing the particular polygon that maps to the different position of a particular value from the plurality of values in the displacement map; and
        moving the particular point away from the flat plane of the particular polygon by an amount derived from the particular value in the displacement map; and
      generate a point cloud from the different set of points replacing each polygon and said displacing of the different set of points, wherein the point cloud does not include a polygon or mesh, and wherein the second resolution of the point cloud produces a visualization of the one or more objects or scenes with a visual quality that is greater than the first resolution of the mesh model enhanced with the enhancement map.

14. The 3D modeling system of claim 13, wherein replacing each polygon comprises:
    defining a first set of points at different positions along a first flat plane that connects to the plurality of vertices of a first polygon from the plurality of polygons with an arrangement and a density specified in the configured distribution; and
    defining a second set of points at different positions along a second flat plane that connects to the plurality of vertices of a second polygon from the plurality of polygons with the arrangement and the density specified in the configured distribution.

15. The 3D modeling system of claim 14, wherein defining the second set of points comprises:
    generating fewer points for the second set of points than the first set of points based on the second flat plane having a smaller surface area than the first flat plane.

16. The 3D modeling system of claim 14,
    wherein defining the first set of points comprises:
      defining the different positions for each point of the first set of points based on different weightings attributed to coordinates associated with each vertex of the plurality of vertices of the first polygon, wherein the different weightings result in a position along the first flat plane that spans between the plurality of vertices of the first polygon; and
    wherein defining the second set of points comprises:
      defining the different positions for each point of the second set of points based on different weightings attributed to coordinates associated with each vertex of the plurality of vertices of the second polygon.

17. The 3D modeling system of claim 14, wherein defining the first set of points comprises:
    determining a surface area of the first flat plane based on coordinates of the plurality of vertices of the first polygon;
    determining a particular number of points to generate as part of the first set of points based on the surface area and a density specified as part of the configured distribution; and generating the first set of points with the particular number of points that satisfies the density and with the different positions of the first set of points forming a pattern specified as part of the configured distribution.

18. The 3D modeling system of claim 13, wherein replacing each polygon comprises:
   selecting the particular polygon from the plurality of polygons;
   obtaining coordinates for each vertex of three or more vertices of the particular polygon; and
   generating a first set of points with coordinates derived from assigning different weights to the coordinates of each vertex of the three or more vertices of the particular polygon.

19. The 3D modeling system of claim 13, wherein replacing each polygon comprises:
   selecting the particular polygon from the plurality of polygons;
   determining a particular flat plane that spans between each vertex of three or more vertices of the particular polygon; and
   generating a first set of points along the particular flat plane with a density that increases a resolution of a surface represented by the particular polygon from the first resolution to the second resolution.

20. A non-transitory computer-readable medium storing instructions that, when executed by one or more processors of a three-dimensional (3D) modeling system, cause the 3D modeling system to perform operations comprising:
   receiving a mesh model comprising a plurality of polygons that are defined in a 3D space, that are connected to at least one other polygon, and that represent one or more objects or scenes at a first resolution, wherein each polygon of the plurality of polygons forms a flat plane between a plurality of vertices with each vertex of the plurality of vertices being shared with at least another polygon;
   replacing each polygon of the plurality of polygons with a different set of points positioned along the flat plane formed by that polygon according to a configured distribution, wherein the different set of points replacing each polygon are disconnected from one another and represent the one or more objects or scenes at a second resolution that is greater than the first resolution, and wherein each point of the different set of points replacing a particular polygon is defined with a different position along the flat plane formed by the particular polygon based on the plurality of vertices of the particular polygon and with visual characteristics that are derived from the plurality of vertices of the particular polygon;
   receiving an enhancement map comprising a plurality of values at different positions in the enhancement map for displacing the plurality of polygons;
   displacing the different set of points replacing each polygon of the plurality of polygons based on a mapping of the plurality of values from the different positions in the enhancement map to corresponding positions of the different set of points replacing each polygon, wherein said displacing comprises:
      determining the different position of a particular point from the different set of points replacing the particular polygon that maps to the different position of a particular value from the plurality of values in the displacement map; and
      moving the particular point away from the flat plane of the particular polygon by an amount derived from the particular value in the displacement map; and
   generating a point cloud from the different set of points replacing each polygon and said displacing of the different set of points, wherein the point cloud does not include a polygon or mesh, and wherein the second resolution of the point cloud produces a visualization of the one or more objects or scenes with a visual quality that is greater than the first resolution of the mesh model enhanced with the enhancement map.

* * * * *